(12) United States Patent
Jannin et al.

(10) Patent No.: US 10,282,910 B2
(45) Date of Patent: May 7, 2019

(54) SIMULATION SYSTEM, CORRESPONDING DEVICES, METHODS AND PROGRAMS

(71) Applicants: Institut National Des Sciences Appliquees (INSA), Rennes (FR); Institut National De Recherche en Informatique et en Automatique (INRIA), Rennes (FR); Institut National De La Sante et de la Recherche Medicale, Paris (FR)

(72) Inventors: Pierre Jannin, Rennes (FR); Bernard Gibaud, La Meziere (FR); Valerie Gouranton, Rennes (FR); Benoit Caillaud, Rennes (FR); Bruno Arnaldi, Rennes (FR)

(73) Assignees: INSTITUT NATIONAL DES SCIENCES APPLIQUEES, Rennes (FR); INSTITUT NATIONAL DE RECHERCHE EN INFORMATIQUE ET EN AUTOMATIQUE, Rennes (FR); INSTITUT NATIONAL DE LA SANTE ET DE LA RECHERCHE MEDICALE, Paris (FR)

( * ) Notice: Subject to any disclaimer, the term of this patent is extended or adjusted under 35 U.S.C. 154(b) by 0 days.

(21) Appl. No.: 15/533,244

(22) PCT Filed: Dec. 2, 2015

(86) PCT No.: PCT/EP2015/078431
§ 371 (c)(1),
(2) Date: Jun. 5, 2017

(87) PCT Pub. No.: WO2016/087555
PCT Pub. Date: Jun. 9, 2016

(65) Prior Publication Data
US 2017/0372521 A1 Dec. 28, 2017

(30) Foreign Application Priority Data

Dec. 3, 2014 (FR) .................................. 14 61848

(51) Int. Cl.
*G06T 19/00* (2011.01)
*G09B 9/00* (2006.01)
(Continued)

(52) U.S. Cl.
CPC ............ *G06T 19/006* (2013.01); *G06F 19/00* (2013.01); *G09B 9/00* (2013.01); *G09B 23/28* (2013.01)

(58) Field of Classification Search
None
See application file for complete search history.

(56) References Cited

U.S. PATENT DOCUMENTS

2013/0095924 A1* 4/2013 Geisner .................. G06F 3/012
463/32
2014/0310595 A1* 10/2014 Acharya ............... G06F 9/4446
715/706

FOREIGN PATENT DOCUMENTS

EP 1605420 A2 12/2005

OTHER PUBLICATIONS

International Search Report dated Jan. 25, 2016 for corresponding International Application No. PCT/EP2015/078431, filed Dec. 2, 2015.
English translation of the International Written Opinion dated Jan. 25, 2016 for corresponding International Application No. PCT/EP2015/078431, filed Dec. 2, 2015.
(Continued)

*Primary Examiner* — Peter Hoang
(74) *Attorney, Agent, or Firm* — David D. Brush; Westman, Champlin & Koehler, P.A.

(57) ABSTRACT

A module for simulating an operative procedure within a virtual environment. The virtual environment is imple-
(Continued)

Figure 1:
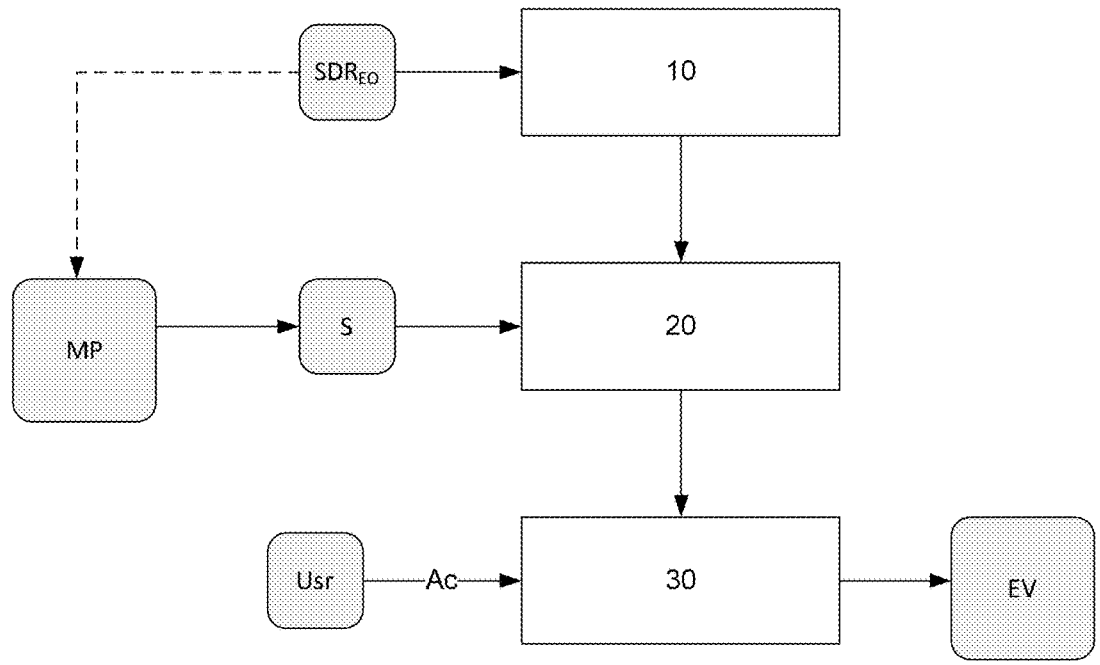

mented by using a device for processing virtual environment data. The module includes: a module configured to obtain a data structure representing a set of objects of the virtual environment and having at least one relationship of interaction between at least two objects; a module configured to receive at least one scenario representing a procedure to be simulated, the scenario being defined on the basis of a descriptive ontology, the at least one scenario being obtained from at least one pre-determined procedural model; a module configured for the rendering, within the virtual environment, at least one portion of the scenario as a function of the set of objects of the virtual environment, the at least one procedural model and at least one action performed by at least one real user of the virtual environment.

6 Claims, 2 Drawing Sheets

(51) Int. Cl.
*G09B 23/28* (2006.01)
*G06F 19/00* (2018.01)

(56) References Cited

OTHER PUBLICATIONS

Thomas Lopez et al., "Collaborative Virtual Training with Physical and Communicative Autonomous Agents", Computer Animation and Virtual Worlds, vol. 25, No. 3-4, May 1, 2014 (May 1, 2014), pp. 485-493, CP055206831.

* cited by examiner

SIMULATION SYSTEM, CORRESPONDING DEVICES, METHODS AND PROGRAMS

CROSS-REFERENCE TO RELATED APPLICATIONS

This Application is a Section 371 National Stage Application of International Application No. PCT/EP2015/078431, filed Dec. 2, 2015, which is incorporated by reference in its entirety and published as WO 2016/087555 A1 on Jun. 9, 2016, not in English.

1. FIELD OF THE INVENTION

The invention relates to the field of simulation. The invention relates more particularly to the field of simulation in virtual reality environments. The invention is situated more particularly in the field of realistic simulation in virtual reality environments representing real environments, designed especially for professional training programs.

2. PRIOR ART

The field of virtual reality has been extensively investigated for many years. Virtual reality can be defined as a visual and/or sonic and/or haptic, immersive interactive computer simulation of environments. The environments in question may be real or imaginary. The simulation is said to be interactive because, unlike in the case of a simple spectator, the user interacts with the virtual environment. The simulation is said to be immersive because it plunges the user into an environment different from the real environment in which he is situated. The simulation is visual and/or sonic and/or haptic because the user is generally provided with visual and sound reproduction equipment (such as a virtual reality headset reproducing sounds and images) and equipment for reproducing physical sensations, especially touch, through gloves, suits or active systems appropriate to this use.

The purpose of virtual reality is to enable a user to carry out sensory-motor and cognitive activity in a digitally created artificial world that may be a simulation of certain aspects of the real world.

Recently, especially because of the development of novel types of screens, the field of virtual reality has seen major progress. Thus, for example, the virtual reality headset built by the company Oculus Rift™ now enables members of the general public to grasp virtual reality simply and at low cost. This type of headset is currently used to develop large-scale consumer applications. These large-scale consumer applications are mainly games, especially derived from third-person games known as FPS (First Person Shoot) games. The advantage of these headsets is that they render images in 3D and thus enable the user to be immersed in an imaginary sound and visual environment.

Such a device can be used for purposes other than this type of application. However, the creation of a virtual environment representing reality is a far more complex task than the modeling of an "imaginary" virtual environment: in the case of real environment, the user takes precise sensory references as his basis. Thus, the creation of a virtual environment representing reality requires more elaborate modeling processes taking into account firstly the real physical objects (that need to be modeled so that they are compliant with reality) and secondly, the physical laws defining the interaction between these objects (so that the interaction of these objects in the virtual world will be identical to the interaction of these objects in the real world). For this second part however, it is possible to make use of existing physics engines which model the interaction between objects, whatever they are, with relative efficiency.

However, modeling difficulties remain. Although the modelling of the environment derived from the real mode is possible, the modelling of the user's actions on the environment derived from the real mode (and vice versa) is far more complex. To return to the comparison with video games, the games engine manages the possible actions on the virtual environment. This engine comprises a certain number of constraints and limits which are generally desired to obtain a rapid and not very complicated video game; the actions are generally limited to the following motions: left, right, forward, rear, high, low, grasp object, shoot, run, jump etc. The interactions with persons are generally few.

This is not the case for the real world. The user immersed in the virtual world representing reality expects to be able to carry out the actions that he wishes to perform, in the same way as he would in the real world. Without going to the extent of imagining an infinite number of possible actions, the number of actions by the user in the virtual world must be high and realistic. Besides, the consequences of actions carried out by the user must also be taken into account by the engine managing the virtual environment. For example, for the virtual environment to be capable of use in training (training in the use of tools or training in interventional or operative techniques or training in driving or training in complex procedures), the sequencing of the actions, their consequences need to be accurately managed by the simulator engine. This is rarely the case at present.

3. SUMMARY OF THE INVENTION

The technique described does not include at least some of these drawbacks of the prior art. According to a first aspect, the technique described relates to a module for simulating an operative procedure within a virtual environment, said virtual environment being implemented by means of a device for processing virtual environment data.

The module for simulating comprises:
- a module configured to obtain a data structure representing a set of objects of said virtual environment, said data structure comprising, in addition, at least one relationship of interaction between at least two objects of said set of objects;
- a module configured to receive at least one scenario representing a procedure to be simulated, said scenario being defined by means of a descriptive ontology, said at least one scenario being obtained from at least one pre-determined procedural model;
- a module configured for the rendering, within said virtual environment, of at least one portion of said scenario as a function of said set of objects of said virtual environment, said at least one procedural model and at least one action performed by at least one real user of said virtual environment.

According to a second aspect, the technique described relates to a system for simulating an operative procedure within a virtual environment, said virtual environment being implemented by means of a device for processing virtual environment data, the system comprising:
- a module for describing the environment, configured to deliver at least one description of a real procedure in the real environment as a function of at least one domain ontology;

a module for creating a procedural model, configured for creating, depending on at least one description of the real environment to be modeled, a procedural model that realizes conditions and transitions between the steps of procedures.

According to one particular embodiment, the module for describing the procedural environment comprises:
- an access to a storage space comprising a physical description of an environment in which a procedure to be describes takes place;
- an access to a storage space comprising a grammar of procedural description, called a domain ontology;
- an entry module, comprising entry means and a graphic interface comprising means of displaying descriptions, said entry module being configured to implement said physical description of the environment and said domain ontology to produce at least one description of a real procedure.

According to one particular characteristic, the module for creating a procedural model comprises:
- an access to a storage space comprising a physical description of the environment in which the operative procedure takes place;
- an access to a storage space comprising a procedural description grammar called a domain ontology;
- an access to a storage space comprising a plurality of descriptions of real procedures;
- an analysis module configured for the analysis, as a function of said domain ontology, of each description of a real procedure of a plurality of descriptions of real procedures to create a procedural module representing conditions and transitions between procedural steps.

According to one particular embodiment, the simulation system comprises furthermore:
- a module for simulating as described here above;
- an immersive device, called a virtual reality device, comprising an immersive room and/or at least one virtual reality headset.

According to another aspect, the technique described also relates to a method for simulating an operative procedure within a virtual environment, said virtual environment being implemented by means of a device for processing virtual environment data. Such a method for simulating comprises:
- a step for obtaining a data structure representing a set of objects of said virtual environment, said set of objects being defined from a descriptive ontology or a formal language, said data structure additionally comprising at least one relationship of interaction between at least two objects of said set of objects;
- a step for receiving at least one scenario representing a procedure to be simulated, said at least one scenario being obtained from at least one pre-determined procedural model;
- at least one rendering step for the rendering, within said virtual environment, of at least one portion of said scenario as a function of said set of objects of said virtual environment, said at least one procedural model and at least one action performed by at least one real user of said virtual environment.

According to one preferred implementation, the different steps of the methods according to the invention are implemented by one or more software computer programs comprising software instructions to be executed by a data processor of a relay module according to the invention and designed to command the execution of the different steps of the methods.

The invention is therefore also aimed at providing a computer program capable of being executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The proposed technique is also aimed at providing an information carrier readable by a data processor and comprising instructions of a program as mentioned here above.

The information carrier can be any entity or communications terminal whatsoever capable of storing the program. For example, the carrier can comprise a storage means such as a ROM, for example, a CD ROM or microelectronic circuit ROM or again a magnetic recording means, for example a floppy disk or a hard disk drive, an SSD etc.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit (ASIC type or FPGA) into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

4. DRAWINGS

Figure 2:
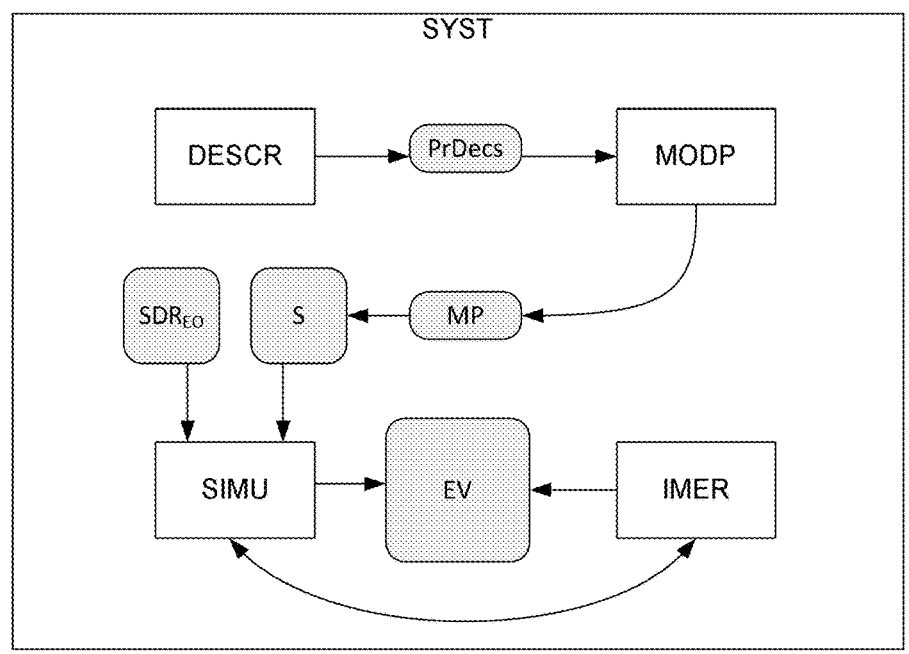
Figure 3:
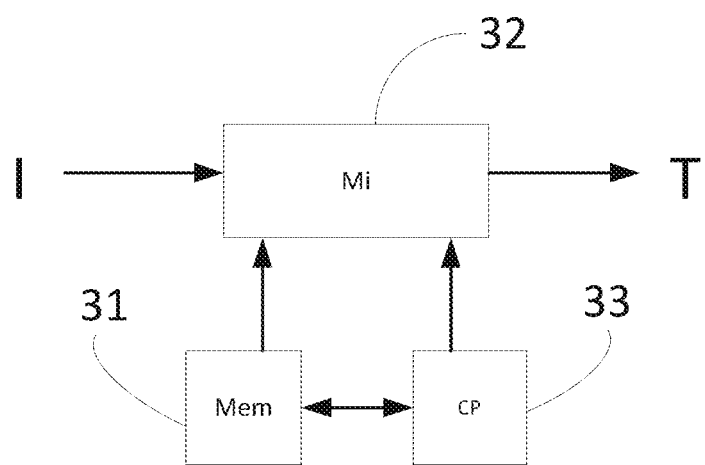

Other features and advantages of the invention shall appear more clearly from the following description, given by way of a simple illustratory and non-exhaustive example and from the appended drawings, of which:

FIG. 1 presents the main steps of the proposed technique;
FIG. 2 schematically represents a system of simulation;

FIG. 3 schematically represents a device implemented to obtain a simulation of a scenario.

5. DESCRIPTION

5.1. General Principle

As explained, the technique is aimed at training staff in a virtual environment reproducing real operative or interventional conditions. The invention relates more specifically to a method for simulating an operative procedure within a virtual environment, said virtual environment being implemented by means of a virtual environment data-processing device (SYST).

Such a method comprises:
- a step (10) for obtaining a data structure representing ($SDR_{EO}$) a set of objects (EO) of said virtual environment (EV), said data structure comprising at least one relationship of interaction between at least two objects of said set of objects;
- a step (20) for receiving at least one scenario (S) representing a procedure to be simulated, said scenario (S) being defined from a descriptive ontology, said at least one scenario (S) being obtained from at least one pre-determined procedural model (MP);
- at least one step (30) for the rendering, within said virtual environment (EV), of at least one portion of said scenario (S) as a function of said set of objects of said virtual environment and of at least one action (Ac) performed by at least one real user (Usr) of said virtual environment (EV).

A system corresponding to the implementing of the technique is described with reference to FIG. 2.

Such a system (SYST) comprises, in one embodiment:
- an environment description module (DESCR). This module is used to describe unitary procedures which are effectively implemented. This module can also be called a procedure/event description module; this module inputs one or more descriptions of the real environment to be modeled. It is based firstly on an initial physical description comprising a certain number of descriptions of objects of the virtual environment and a procedural description grammar, also called an ontology; the description module also inputs a domain ontology. At output, it produces a description of one or more real procedures or ideal procedures, called described procedures (PrDecs). Thus, the description module (DESCR) comprises:
  - an access to a storage space comprising a physical description of an environment in which a procedure to be described takes place;
  - an access to a storage space comprising a procedural description grammar called a domain ontology;
  - an entry module, comprising entry means and a graphic interface comprising means for displaying descriptions, said entry module being configured to implement said physical description of the environment and said domain ontology to produce at least one description of a real procedure.

The storage spaces are, if necessary, shared, or they are common with the other modules:
- a creation module (MODP) for the creation of procedural model. This module uses one or more descriptions of real or ideal procedures; it delivers a procedural model representing conditions and transitions between the steps of procedures; this model depends on the ontology; the module for creating procedural models thus comprises:
  - an access to a storage space comprising a physical description of the environment in which the operative procedure takes place;
  - an access to a storage space comprising a plurality of descriptions of real procedures;
  - an analysis module configured for the analysis, depending on said domain ontology, of each description of a real procedure of a plurality of descriptions of real procedures to create a procedural module (MP) representing conditions and transitions between the steps of the procedures.

In a complementary way, such a system (SYST) also comprises:
- a simulation module (SIMU) implementing the method described here above;
- an immersive system (IMER), called a virtual reality system comprising for example an immersive room and/or virtual reality headsets and/or other immersion devices; this immersive system (IMER) is driven by a virtual reality engine (ENG). Such an engine manages the immersive display (by means of the above mentioned devices) and the actions of the users. It inputs the physical model of the virtual environment as well as the outputs produced by the simulation module.

An intervention scenario (or training scenario) is based typically on a procedural model or a subset of the procedural model and it comprises the execution of a series of steps that must be implemented by a user (whether real or virtual) in the context of the simulation of the operative procedure (work procedure, operative procedure in specific areas, surgical procedure).

The proposed technique also relates to several methods used in the above-mentioned devices. The first phase of the method is a descriptive phase in which one or more descriptions of procedures are achieved. The second phase of the method is an analytic phase in which the descriptions are analyzed.

Thus, in one embodiment, the technique consists in creating and providing the virtual reality engine elementary tasks representing consistent and realistic actions combined in the procedural model. These elementary tasks thereafter make it possible to carry out, within a virtual environment, a simulation of a real situation or at least a realistic situation by means of a pre-set scenario and to understand or follow the scenario followed by the real actor or actors. The goal of the system is to enable real users to get trained in a virtual environment in various situations that might unfold within a given real environment. The system of the present technique finds application for example in the training of teams taking action in confined and controlled environments such as action teams in sensitive sites (nuclear power stations, chemical processing plants). This system can also find application for surgical teams so that these teams can get trained in operative procedures for patients. The system can also find application in the training of security staff and technical action staff or maintenance staff (garage workers, electricians etc).

The elementary tasks are provided in parallel to the physical models of the virtual environment. More specifically, the physical models of the virtual environment are especially managed by a physics engine, the goal of which is to represent the physical objects of the virtual environment and their interactions. From this point of view, the virtual reality engine and the physics engine hardly differ from an applications engine and a physics engine of a large-scale consumer application.

The elementary tasks for their part represent interactions between individuals or between individuals and objects, whether real or virtual. An elementary task can, for example, represent a type of action produced by a real user and the reaction of a real user. Conversely, an elementary task can represent a type of action produced by a virtual user and the (expected) reaction of a real user. An elementary task can again represent a type of action produced by a virtual user and the reaction of a virtual user. An elementary task can also represent a type of action produced by a real user and the reaction of one or more virtual objects.

The elementary tasks are organized in a consistent set of elementary tasks representing a set of possible actions and interactions. The goal is to have available a combined representation of the different elementary tasks and their sequencing so that the virtual reality engine can compute possible reactions on the basis of an action (corresponding to a given elementary task). For a given elementary task, several reactions may exist. In this case, the reactions are so to speak, weighted on the basis of subsequent or prior observations. Depending on the embodiments, probabilistic, statistical or pseudo-random selection methods can be implemented to manage the sequencing of the actions and reactions on the basis of elementary tasks and their sequencing. In other words, the consistent set of elementary tasks represents the field of possibilities.

The procedural model is organized within a data structure. The data structure comprises several types of elements, including "elementary task" types of elements. The "elementary task" types of elements include at least the following data: data representing action, data representing the object of the action, data representing a reaction and data representing one or more of the subsequent elementary tasks, possibly weighted according to the probability of occurrence of these following elementary tasks.

Naturally, this procedural model is more or less correlated with the virtual world itself and therefore with all the virtual objects forming this world. The degree of correlation of the set of elementary tasks depends on the number of elementary tasks involving the implementation of an object of the virtual world and therefore on the description of the virtual world itself. The procedural model is highly correlated with the virtual world when the number of elementary tasks having an influence on one or more objects of the virtual world is great. The procedural model is weakly correlated with the virtual world when the number of elementary tasks having influence on one or more objects of the virtual world is small. As can be noted here below, this distinction is relatively important in terms of defining the procedural model. The simulations involving few interactions with the environment are simpler to implement than simulations involving numerous interactions with the environment.

Since the virtual reality engine uses this procedural model, it is necessary to have available a method for creating this procedural model.

Thus, the system of the invention has available a module for creating sets of elementary tasks. This module uses one or more descriptions of the real environment to be modeled. The module for creating the set of elementary tasks is described in greater detail here below.

The descriptions of the environment are made by means of an adapted description module. This description module includes an entry module comprising means of entry and a graphic interface comprising means for displaying descriptions. Such a description module takes, for example, the form of a dedicated application installed for example, on a tablet or a laptop, to enable the entry of the description of the environment.

A description of the environment is generally of two different types: a physical description comprising for example, a description of the elements forming the physical environment and a procedural description (or an event-based description) comprising the description of the way in which the users interact with the environment to carry out one or more given tasks. As an input, the module for creating the procedural model uses a procedural description of the environment. In the context of the invention, this procedural description is based on a physical description preliminarily made and integrated within the description module.

In addition to a physical description of the environment, the description module also inputs a procedural description grammar. This procedural description grammar is used to define an appropriate description reference system. This grammar can also be called an ontology. It defines the bases of the description, namely a common description language that can be used to describe the way in which the procedures are really implemented and the way in which the events are sequenced. These are axioms that are considered to be true in describing such and such an event or such and such a procedure. The ontology of course is adapted to the procedures or to the events that are to be described. In the case of a description of a procedure for replacing a part in a car, the ontology enables the definition of the language to describe a replacement procedure and is based on a physical description of a set or a sub-set of parts of an engine. It includes the concepts (the terms) their attributes, the relationships between concepts and the logical rules of the domain. Through the entry module, the description module enables a description of the different steps needed to replace the part by means of the pre-defined ontology, such as for example: remove the water pump by means of a 12 mm wrench; make the flywheel rotate by hand; block the engine flywheel in a locked position using a locking device; remove the timing belt by hand; place a new timing belt; mount a new water pump; mount the belt on the new water pump; release the flywheel. The procedure for replacing a timing belt is thus described in procedural terms on the basis of a physical description (the elements of the engine, the tools needed) and a grammar (remove, cause to rotate, lock, mount, release, using etc). The case illustrated here above is a simple case. A more complex case is described in the description of the embodiment.

Whatever the means used, the module for creating the procedural model comprises at input a set of descriptive recordings made with the recording module. The module for creating the procedural model on the basis of the descriptive recordings determines elementary tasks to implement real or realistic procedures.

To this end, the module for creating the set of elementary tasks is based on descriptions to identify the phases, steps, sub-steps needed for implementing procedures. It works by iterative analysis and classification of the recordings. In a complementary way, it determines, in the procedural model produced, possible sequencings of steps and sub-steps corresponding to procedures that are not necessarily recorded but are "realistic" procedures. This can correspond for example, to a sequencing of steps to carry out a procedure where this sequencing does not correspond to a sequencing recorded in one of the descriptions. Thus, it is on the basis of this procedural model that the interventional or operative scenarios can be built. They correspond to the implementing of a sub-set of procedural models to attain a given result.

Thus, to return to the previous example, it can happen that the replacement of the timing belt does not include the locking of the flywheel or again, that it comprises the locking of the flywheel at the outset of the operation (before any dismantling). If several different recordings of the procedure for dismantling the timing belt have been made, then the module for creating the set of elementary tasks can, for a descriptive scenario describing the "replacement of the timing belt", indicate the fact that (a) the step for locking the engine flywheel is optional and (b) it can take place after the dismantling of the water pump.

5.2. Description of One Embodiment

In this embodiment, the system of the invention is implemented to carry out simulations of surgical operations. More particularly, in this embodiment, it is sought to simulate the interaction between different members of a surgical operating team for purposes of training. Teams of nurses can thus be trained for a specific surgical operation made by a virtual surgeon. A surgeon can also be trained in the practice of a specific operation that he or she may not yet have had the opportunity to perform (on his own). In this embodiment, it is proposed to automate the production of the virtual training scenarios and facilitate their use in virtual reality in domains where the scenarios are complex and variable and must nevertheless be realistic.

It includes the use of a corpus of examples of real procedures, described according to a description model compliant with a domain ontology.

One scenario therefore is a description of procedures that can describe processes at different levels of granularity (typically "complete procedure", "phase", "procedure step", "elementary action"). For example, for each elementary action, the model makes it possible to specify the type of action carried out (for example, make an incision), the object to which it relates (for example, the patient's skin), the instrument used (for example, a scalpel), the person who acts and, if it is human actor, a specification of the part of the body brought into play, for example the surgeon's right hand. Since these actions are identified in time and space, this model enables a description of the entire running of the procedure.

The first phase of the method is a descriptive phase in which one or more descriptions of surgical procedures are carried out. The descriptions of surgical procedures are based on an ontology as a language of description. These descriptions can be made by observation, by interviews, on the basis of post-operative reports, or automatically. By observation, an operator observes what the actor has done and describes his understanding of the scenario. This observation can be done during the surgical procedure or it can be done at a different time using the video recordings of the procedure. Through interviews, the actor or a group of actors (human in this case) explains what he generally does and the interviewer records this description on an adapted device which enables the description made to be re-transcribed by means of the pre-defined ontology. The descriptions can also be generated automatically by the use of action sensors, sensors of actors, instruments or other effectors. The interpretation of the signals from the sensors generates a description of the procedure. The descriptions concern the pre-operative vision of the procedure (what is planned to be achieved), the intra-operative vision (what is achieved) or the post-operative vision (what has been achieved). It is also possible to describe what should have been achieved (ideal procedure).

The second phase of the method is an analytical phase in which the descriptions are analyzed. The corpus of the description (corresponding to a single theoretical procedure) is analyzed to create a generic, and generative, model capable of generating new fictitious examples, reproducing the schemes observed in the real examples. This is, for example, a Test & Flip method. Test & Flip type networks are a restriction of the Petri nets in the set of Boolean values. This does away with the need for processes where one action is followed by another action for a certain number of times that varies from one example to another. There are six types of transitions possible between a state (place) and a transition (event): the orthogonal transition (nothing is done), the flip transition (whatever the state, 0 or 1, of the place, the state is complemented), the plus transition (if the place is at 0, it is complemented), the minus transition (if the place is at 1, it is complemented), the 0 transition (a test is made to see if the state is 0 but nothing is done) and the 1 transition (a test is made if the state is at 1 but nothing is done). Using examples of the process of interest, the principle of synthesis is to find the Test & Flip network that represents the smallest language that includes the language represented by the examples given as inputs, i.e. finding a set of places and transitions that best represents the process described herein. This is what induces generalization because, when it is not possible to resolve problems directly, states are added in the set of initial processes, which amounts to augmenting the language.

This model comprises a certain number of phases, steps and sub-steps which correspond to a possible procedure, possibly with feedback loops and complementary steps (depending on the quantities of descriptive recordings used and divergences between the recordings). For example, from of descriptions of a corneal transplant procedure, a generic model of corneal transplants is created.

For this second phase of the general method, a basic Test & Flip method is thus modified to take account of particular knowledge in the domain represented in the ontology. Indeed, the information exploited by the initial Test & Flip algorithm considers only entities associated with instances and identified by simple labels of entities.

The proposed modification which exploits the ontology enables the insertion (and then the use) of complementary data within a generic model: for example, the fact that a class of action can be achieved only by certain classes of actors or again that certain elementary actions assume that an elementary action of a certain type has been made preliminarily, or that certain actions require the use of particular instruments etc. The invention also exploits the fact that the instances are related to classes of ontology, themselves situated in a complete taxonomy organized by means of axioms expressed in a logical language. As a consequence, the entities associated with the instances are no longer simple labels but convey a rich semantics, specific to the domain considered. Thus, the procedural model obtained carries a meaning of the actions that form it. Besides, such a procedural model enables the management of the hierarchical aspects and the multi-actor aspects, especially by the association, for a given action or class of action, of a class of actor or a particular actor.

The ontology can be formalized in a language of representation of knowledge belonging to the family of description logics (DL) which constitutes a decidable fragment of the first-order logic. It can be expressed by using the OWL (Ontology Web Language), that facilitates the sharing of ontologies on the web.

This extension of the possibilities of the "Test & Flip" according to the invention thus further constrains the space of the possible scenarios and therefore simplifies the work (done manually or not manually) of validating the realistic character of the models proposed.

In other words, the method of exploitation in the subject of "Virtual Reality" of a scenario in the form of virtual training is based:

on the one hand on a representation, in a virtual environment, of the elements belonging to the classes of the ontology. This step expresses, in the form of three-dimensional virtual objects and interactive relationships between these objects, the elementary actions of the scenario model (for example, objects, instruments, the actors), On the other hand the scenario (produced by the extension of the Test & Flip) is exploited directly as a tool for controlling the interactive simulation making it possible to place one or more real or virtual users in a situation of collaborative virtual training, The method can also comprise a step for creating a scenario chosen on the basis of the procedural model. In the constraint mode, this scenario will be followed by the virtual actor or actors. In free mode, the real actor can carry out any action and any scenario freely: the virtual actors react according to and consistently with the procedural model.

The method thus enables the execution of the entire process by establishing a chain which, on the basis of a 3D interaction of the actor, triggers the forward progress of the process of the domain by a change in state of the scenario engine which in turn triggers the virtual performance of the action in the 3D environment. The change in state of the scenario engine is effective when the real user's action is valid (i.e. when it is represented by a transition contained in the space of possible scenarios). In the case of non-valid action, a specific processing can be integrated according to the requirements of the domain.

5.3. Other Characteristics and Advantages

Referring to FIG. 3, a description is provided of a device implemented to obtain a simulation of scenarios according to the method described here above. Such a device can take the form of a module as described here above. For example, the device comprises a memory 31 constituted by a buffer memory, a processing unit 32, equipped with, for example, a microprocessor and driven by the computer program 33 implementing a method of simulation.

At initialization, the code instructions of the computer program 33 are for example loaded into a memory and then executed by the processor of the processing unit 32. The processing unit 32 inputs a description of the virtual environment, a procedural model and/or a scenario. The microprocessor of the processing unit 32 implements the steps of the method according to the instructions of the computer program 33 to generate data representing actions achieved or to be achieved by real or virtual users of the simulation in order to carry out the scenario or operation planned.

To this end, the device comprises, in addition to the buffer memory 31, communications means such as network communications modules, data transmission means and possibly an encryption processor.

These means can take the form of a particular processor implemented within the device, said processor being a secure processor. According to one particular embodiment, this device implements a particular application which is in charge of the computations.

These means also take the form of communications interfaces used to exchange data on communications networks, interrogation means and means for updating databases etc.

More particularly, such a device comprises:

a module configured to obtain (10) a data structure representing ($SDR_{EO}$) a set of objects (EO) of said virtual environment (EV), said data structure also comprising at least one relationship of interaction between at least two objects of said set of objects;

a module configured to receive (20) at least one scenario (S) representing a procedure to be simulated, said scenario (S) being defined from a descriptive ontology, said at least one scenario being obtained from at least one pre-determined procedural model (MP);

a module configured to render (30) within said virtual environment (EV), at least one portion of said scenario according to said set of objects, said virtual environment, said at least one procedural model and at least one action achieved by at least one real user of said virtual environment.

The rendering module (30) is driven by a virtual reality engine (31). Such an engine manages the immersive display (by means of the above mentioned devices) and the actions of the users. It inputs the physical model of the virtual environment as well as a procedural model and/or a scenario.

The system also comprises interaction devices (sensors, cameras etc) and sensory rendering devices (image generators, screen, sound card, speakers etc).

The invention claimed is:

1. An apparatus for simulating an operative procedure within a virtual environment, said virtual environment being implemented by using a device for processing virtual environment data, said apparatus for simulating comprising:

a processor; and a non-transitory computer-readable medium comprising instructions stored thereon, which when executed by the processor configure the apparatus to perform acts comprising:

obtaining a data structure representing a set of objects of said virtual environment, said data structure additionally comprising at least one relationship of interaction between at least two objects of said set of objects;

receiving at least one scenario representing the operative procedure to be simulated, said at least one scenario being obtained from at least one pre-determined procedural model comprising a set of elementary tasks, each elementary task of said set comprising data representing at least one action, an object of said action, a reaction following said action and one or more subsequent elementary tasks, said procedural model representing conditions and transitions between steps of the operative procedure to be simulated, said procedural model being created by analysis, as a function of a domain ontology, of each description of a plurality of descriptions of a real procedure associated with said operative procedure, said domain ontology being a grammar of procedural description; and rendering, within said virtual environment, at least one portion of said scenario as a function of said set of objects of said virtual environment, said at least one procedural model and at least one action performed by at least one real user of said virtual environment.

2. A system for simulating an operative procedure within a virtual environment, said virtual environment being implemented by using a device for processing virtual environment data, said system being comprising:

a processor; and a non-transitory computer-readable medium comprising instructions stored thereon, which when executed by the processor configure the system to perform acts comprising:

describing the environment, delivering at least one description of a real procedure in the real environment as a function of at least one domain ontology, a domain ontology of said at least one domain ontology being a grammar of procedural description;

storing said at least one description of a real procedure in the real environment in a storage space, so that said storage space comprises a plurality of descriptions of real procedures;

analyzing, as a function of said domain ontology, each description of a real procedure of said plurality of descriptions of real procedures stored in said storage space; and creating, from said analyzing, a procedural model representing conditions and transitions between steps of procedures, said procedural module comprising a set of elementary tasks, each elementary task of said set comprising data representing at least one action, an object of said action, a reaction following said action and one or more subsequent elementary tasks.

3. The system for simulating an operative procedure according to claim 2, further comprising:

an access to a storage space comprising a physical description of an environment in which a procedure to be describes takes place;

an access to a storage space comprising a procedural description grammar, corresponding to the domain ontology; and an entry module, comprising entry means and a graphic interface comprising means of displaying descriptions, said entry module being configured to implement said physical description of the environment and said domain ontology to produce at least one description of a real procedure.

4. The system for simulating an operative procedure within a virtual environment according to claim 2, wherein the system further comprises:

a module for simulating the operative procedure within the virtual environment, said module for simulating comprising:

a module configured to obtain a data structure representing a set of objects of said virtual environment, said data structure additionally comprising at least one relationship of interaction between at least two objects of said set of objects;

a module configured to receive at least one scenario representing the procedure to be simulated, said at least one scenario being obtained from the created procedural model comprising the set of elementary tasks; and a module configured to render, within said virtual environment, at least one portion of said scenario as a function of said set of objects of said virtual environment, said at least one procedural model and at least one action performed by at least one real user of said virtual environment; and an immersive device called a virtual reality device, comprising an immersive room and/or at least one virtual reality headset.

5. A method for simulating an operative procedure within a virtual environment, said virtual environment being implemented by using a device for processing virtual environment data, said method for simulating comprising the following acts, at least partly performed by a processor of the device executing instructions stored on a non-transitory computer-readable medium:

obtaining a data structure representing a set of objects of said virtual environment, said set of objects being defined from a domain ontology, said data structure additionally comprising at least one relationship of interaction between at least two objects of said set of objects;

receiving at least one scenario representing the operative procedure to be simulated, said at least one scenario being obtained from at least one pre-determined procedural model comprising a set of elementary tasks, each elementary task of said set comprising data representing at least one action, an object of said action, a reaction following said action and one or more subsequent elementary tasks, said procedural model being obtained from said data structure representing said set of objects of said virtual environment, said procedural model representing conditions and transitions between steps of the operative procedure to be simulated, said procedural model being created by analysis, as a function of a domain ontology, of each description of a plurality of descriptions of a real procedure associated with said operative procedure, said domain ontology being a grammar of procedural description; and rendering, within said virtual environment, at least one portion of said scenario as a function of said set of objects of said virtual environment, said at least one procedural model and at least one action performed by at least one real user of said virtual environment.

6. A non-transitory computer-readable medium comprising a computer program product stored thereon and comprising program code instructions for executing a method for simulating an operative procedure within a virtual environment, when the instructions are executed by a processor, wherein said virtual environment is implemented by using a device for processing virtual environment data, and wherein the instructions configure the processor to perform acts comprising:

obtaining a data structure representing a set of objects of said virtual environment, said set of objects being defined from a domain ontology, said data structure additionally comprising at least one relationship of interaction between at least two objects of said set of objects;

receiving at least one scenario representing the operative procedure to be simulated, said at least one scenario being obtained from at least one pre-determined procedural model comprising a set of elementary tasks, each elementary task of said set comprising data representing at least one action, an object of said action, a reaction following said action and one or more subsequent elementary tasks, said procedural model being obtained from said data structure representing said set of objects of said virtual environment, said procedural model representing conditions and transitions between steps of the operative procedure to be simulated, said procedural model being created by analysis, as a function of a domain ontology, of each description of a plurality of descriptions of a real procedure associated with said operative procedure, said domain ontology being a grammar of procedural description; and rendering, within said virtual environment, at least one portion of said scenario as a function of said set of objects of said virtual environment, said at least one procedural model and at least one action performed by at least one real user of said virtual environment.

* * * * *